United States Patent
Tagge

(10) Patent No.: US 6,436,864 B1
(45) Date of Patent: Aug. 20, 2002

(54) UNSATURATED NITROGENOUS COMPOUNDS AS ELECTRON DONORS FOR USE WITH ZIEGLER-NATTA CATALYSTS

(75) Inventor: Christopher D. Tagge, San Carlos, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/414,131

(22) Filed: Oct. 6, 1999

(51) Int. Cl.[7] .......................... B01J 31/00; B01J 37/00; C08F 4/02; C08F 4/60
(52) U.S. Cl. .................. 502/123; 502/124; 502/167; 502/121; 502/122; 502/125; 502/126; 502/162; 502/168; 502/172
(58) Field of Search ............................... 502/123, 124, 502/167

(56) References Cited

U.S. PATENT DOCUMENTS

| | | | |
|---|---|---|---|
| 3,197,452 A | | 7/1965 | Natta et al. |
| 3,668,146 A | * | 6/1972 | Ruhle ..................... 252/428 |
| 3,691,095 A | | 9/1972 | Kroll et al. |
| 3,903,017 A | | 9/1975 | Ziegler et al. |
| 3,907,761 A | * | 9/1975 | Boucheron et al. ......... 502/123 |
| 3,957,743 A | | 5/1976 | Natta et al. |
| 4,063,009 A | | 12/1977 | Ziegler et al. |
| 4,107,414 A | | 8/1978 | Giannini et al. |
| 4,125,698 A | | 11/1978 | Ziegler et al. |
| 4,211,670 A | | 7/1980 | Vandenberg |
| 4,310,439 A | | 1/1982 | Langer |
| 4,317,898 A | * | 3/1982 | Karayannis et al. ........ 502/123 |
| 4,495,338 A | | 1/1985 | Mayr et al. |
| 4,522,930 A | | 6/1985 | Albizzati et al. |
| 4,610,974 A | * | 9/1986 | Speca ..................... 502/124 |
| 4,634,687 A | * | 1/1987 | Fujita et al. .............. 502/124 |
| 4,870,042 A | * | 9/1989 | Kohara et al. ............. 502/123 |
| 5,068,213 A | | 11/1991 | Albizzati et al. |
| 5,095,153 A | | 3/1992 | Agnes et al. |
| 5,118,768 A | * | 6/1992 | Job et al. ................. 502/123 |
| 5,164,352 A | * | 11/1992 | Job et al. ................. 502/124 |
| 5,270,276 A | | 12/1993 | Job |
| 5,294,581 A | * | 3/1994 | Job ........................ 502/124 |
| 5,459,117 A | | 10/1995 | Ewen |
| 5,504,048 A | | 4/1996 | Shamshoum et al. |
| 5,557,023 A | | 9/1996 | Somogyvari et al. |
| 5,661,097 A | | 8/1997 | Spencer et al. |
| 5,866,663 A | | 2/1999 | Brookhart et al. |
| 5,869,418 A | | 2/1999 | Iiskola et al. |
| 5,891,817 A | | 4/1999 | Shamshoum et al. |
| 6,093,673 A | * | 7/2000 | Klendworth et al. ........ 502/123 |
| 6,096,676 A | * | 8/2000 | Murray .................... 502/117 |
| 6,103,657 A | * | 8/2000 | Murray .................... 502/155 |
| 6,114,276 A | * | 9/2000 | Kong et al. ................ 502/124 |
| 6,143,684 A | * | 11/2000 | Morini et al. .............. 502/124 |
| 6,150,295 A | * | 11/2000 | Eilerts .................... 502/123 |
| 6,162,884 A | * | 12/2000 | Alt et al. .................. 502/123 |
| 6,320,005 B1 | * | 11/2001 | Murray .................... 502/155 |

FOREIGN PATENT DOCUMENTS

| | | | | |
|---|---|---|---|---|
| EP | 0362705 | | 4/1990 | |
| EP | 0416815 | | 3/1991 | |
| EP | 0451645 | | 10/1991 | |
| EP | 0589474 | | 3/1994 | |
| EP | 0336545 | | 4/1995 | |
| EP | 0728724 | | 8/1996 | |
| EP | 0728741 | | 8/1996 | |
| FR | 2768148 | | 3/1999 | |
| GB | 904083 | * | 8/1962 | ............... 502/123 |
| JP | 41-17671 | * | 10/1966 | ............... 502/124 |
| JP | 41-19993 | * | 11/1966 | ............... 502/124 |
| JP | 43-5754 | * | 3/1968 | ............... 502/123 |
| JP | 43-15827 | * | 7/1968 | ............... 502/124 |
| JP | 43-18907 | * | 8/1968 | ............... 502/123 |
| JP | 44-1435 | * | 1/1969 | ............... 502/124 |
| JP | 53-5287 | * | 1/1978 | ............... 502/124 |
| WO | WO 94/07926 | | 4/1994 | |
| WO | WO 99/11677 | | 3/1999 | |

OTHER PUBLICATIONS

Yano et al. (1986), "Supported Catalyst for Olefin Polymerization, the Role of the Third Component," *Eur. Polym. J.* 22(8):637–641.

* cited by examiner

Primary Examiner—Mark L. Bell
Assistant Examiner—J. Pasterczyk
(74) Attorney, Agent, or Firm—Reed & Associates; Dianne E. Reed; J. Elin Hartrum

(57) ABSTRACT

Unsaturated nitrogenous compounds are used as electron donors in conjunction with catalytic polymerization of addition polymerizable monomers such as olefins, using supported Ziegler-Natta catalysts. The electron donors may be used in the preparation of catalyst systems, thus serving as "internal" electron donors, or they may be added during or just prior to polymerization, as an "external" electron donor.

27 Claims, No Drawings

UNSATURATED NITROGENOUS COMPOUNDS AS ELECTRON DONORS FOR USE WITH ZIEGLER-NATTA CATALYSTS

TECHNICAL FIELD

This invention relates generally to the field of catalysis, and more particularly relates to electron donor compounds for use with Ziegler-Natta polymerization catalysts. The invention additionally relates to novel Ziegler-Natta catalyst systems that employ an unsaturated nitrogenous compound as an electron donor, to methods for manufacturing Ziegler-Natta catalyst systems containing such compounds, and to methods for polymerizing addition polymerizable monomers, e.g., olefins, using a Ziegler-Natta catalyst system that employs an unsaturated nitrogenous compound as an internal and/or external electron donor.

BACKGROUND

The extensive use of polymers in daily life is largely attributable to improvements in polymer manufacturing processes as well as improvements in polymer properties. For polyolefin production, the work of Karl Ziegler and Giulio Natta, in the early 1950s, has served as a starting point for numerous advances in the technology.

The basis of the Ziegler catalysts was a complex of a transition metal compound with an organometallic compound (see Ziegler et al., U.S. Pat. Nos. 3,903,017, 4,063,009 and 4,125,698). One of the most preferred examples was titanium tetrachloride combined with triethylaluminum in a hydrocarbon solution. Using the new catalyst, Ziegler produced long chain polyethylene molecules from ethylene at atmospheric pressure. The polymerization of other olefins was also possible using the Ziegler catalysts.

Polymers produced using the early Ziegler catalysts were typically amorphous. Amorphous polymers, such as amorphous polyethylene, have inadequate material properties for a number of applications. Although the Ziegler catalyst systems made it easier to produce linear polyolefins, the resulting polymers had many properties like those of the polymers produced using competing processes involving either thermal-high pressure processes or chromium oxide catalysts. See F. Albert Cotton and Geoffrey Wilkinson, "Advanced Inorganic Chemistry: A Comprehensive Text," 3rd ed., Wiley & Sons, Inc., 1972, pp. 794–795.

Giulio Natta et al., U.S. Pat. Nos. 3,197,452 and 3,957,743, developed improved Ziegler type catalysts that permitted the production of higher quality polyolefins with stereochemical control properties, i.e. stereospecificity. The Natta catalysts allowed production of long chain polyolefins that were crystalline rather than amorphous. Control of the polymer stereochemistry required a crystalline catalyst surface. See Brian L. Goodall, "Polypropylene: Catalyst and Polymerization Aspects," in Polypropylene and Other Polyolefins, ed. Ser van der Ven (Amsterdam: Elsevier Science Publishers B.V., 1990), at pp. 1–25. The stereospecificity depended on the particular crystalline phase. Titanium halides were found to produce the highest catalytic activity. Favored compounds were titanium trichloride and titanium tetrachloride with titanium trichloride preferred; both compounds gave similar results when used to produce crystalline polypropylene. Crystalline polypropylene was also obtained using vanadium, chromium, zirconium, and molybdenum compounds. Aluminum alkyls other than triethylaluminum produced crystalline polymers as well.

Further efforts to improve the performance of Ziegler-Natta catalysts included the use of a catalyst support for the active components of the catalyst. For example, Mayr et al., U.S. Pat. No. 4,495,338, describe the use of magnesium or zinc halide support materials with Ziegler-Natta catalyst components. Treatment of the catalyst with an electron donor (and/or polymerization in the presence of an electron donor) has also been found to increase the activity and selectivity of Ziegler-Natta catalysts. Several varieties of compounds have been found to have suitable properties as electron donors. Electron donating compounds used to process the transition metal component of Ziegler-Natta catalysts are called "internal" electron donors, while those added during or immediately prior to polymerization are termed "external" electron donors.

Bailly et al., EP 336,545, described a method for preparing high activity Ziegler-Natta catalysts supported on magnesium dichloride substrates. As part of the catalyst preparation process, the magnesium dichloride support was contacted with electron donor compounds (i.e., as "internal" electron donors) prior to incorporating the titanium component. The specified electron donors had labile hydrogen; suitable donor compounds included water, alcohols, phenols, thiols, and hydrogen sulfide. An optional step was also suggested that included treatment with an ester of an aromatic acid. The esters were chosen from ethyl benzoate, methyl paratoluate, and dibutyl or diisobutyl phthalate.

Although internal electron donors improved the selectivity and activity of Ziegler-Natta catalysts to some extent, a significant amount of amorphous polymer was still produced. It was later found that including an additional catalyst preparation step could increase the crystalline yield. The solution was to use a first electron donor treatment for the titanium component as well as a second electron donor treatment for the aluminum compound processing step (see Goodall supra).

Giannini et al., U.S. Pat. No. 4,107,414, processed Ziegler-Natta catalyst components supported on magnesium dichloride substrates with both internal and external electron donor compounds. The resulting catalysts had high activity and increased stereospecificity. Some of the recommended internal electron donor compounds were veratrol, ethyl benzoate, acetone, dimethylmalonate, and tetrahydrofuryl methyl ether. Giannini et al. also found that the diamines and esters of oxygenated organic and inorganic acids were particularly suitable for improving the activity and stereospecificity of the catalysts. Suitable external electron donor compounds included esters of oxygenated organic and inorganic acids.

Albizzati et al., U.S. Pat. No. 4,522,930, also describe use of both internal and external electron donors in Ziegler-Natta catalyst systems. The proposed internal electron donor compounds were ethers, ketones, lactones, esters, and compounds containing nitrogen, phosphorous and/or sulfur atoms. The external electron donors were compounds that contained Si—OR, Si—OCOR, or Si—NR$_2$ groups.

Further development work on Ziegler-Natta catalysts led to the discovery of diethers as electron donors; see, e.g., EP 728,741 (Morini et al.), EP 361,949 (Scordamaglia et al.), and EP 362,705 (Barbe et al.).

To improve the performance of diether electron donors for Ziegler-Natta catalysts, mixtures of diethers plus other electron donors have been used in preparation of the catalysts. For example, Iiskola et al., U.S. Pat. No. 5,869,418, describe an external electron donor containing a diether compound and an alkoxysilane. The two-component external donor mixtures were found to result in an increase in isotacticity and a broader molecular weight distribution for the polymeric product.

To further improve the performance of diether electron donors, Albizzati et al., U.S. Pat. No. 5,068,213, produced catalysts using modified diethers or polyethers as internal electron donors. The modification included adding at least one heteroatom (nitrogen, sulfur, phosphorus, silicon, non-ether oxygen, halogen) and/or double bond to the diether or polyether. The result of using the modified diethers was a Ziegler-Natta catalyst with high activity and stereospecificity without the need for external electron donors.

Although the diether-prepared Ziegler-Natta catalysts are being adopted extensively for commercialization, there is still a significant need to further improve the performance of Ziegler-Natta catalysts. Another reason for continued development of Ziegler-Natta catalysts is the continuing need to further increase polymer processability and decrease the cost of producing both catalysts and polymers.

Thus, the art provides Ziegler-Natta catalysts prepared using selected compounds or selected classes of compounds having electron donor properties that improve catalyst performance. However, prior catalyst systems and electron donor compositions, as described above, fail to meet all of the requirements for Ziegler-Natta catalysts. The existing Ziegler-Natta catalysts and electron donor compounds are still inadequate with respect to activity, stereospecificity, and control of polymer properties. From a cost and manufacturability standpoint, it is desirable to further improve the performance of electron donors for Ziegler-Natta catalysts.

Accordingly, there is a need in the art for higher performance Ziegler-Natta catalyst systems. The present invention is addressed to the aforementioned need in the art, and provides novel Ziegler Natta catalyst systems having numerous advantages relative to prior systems, in that they:

(1) allow for exceptional control over the structure and properties of the polymeric product, particularly with regard to molecular weight, tacticity, and relative reactivity ratio;

(2) are highly active polymerization catalysts;

(3) have enhanced stability;

(4) display optimal hydrogen sensitivity; and (5) are quite versatile and can be used in conjunction with a variety of monomer types.

The invention thus represents a significant advance in the field of catalysis.

SUMMARY OF THE INVENTION

Accordingly, it is a primary object of the invention to provide novel catalyst systems useful for the polymerization of addition polymerizable monomers, e.g., olefinic monomers.

It is another object of the invention to provide such catalyst systems which comprise a Ziegler-Natta catalyst in combination with an unsaturated nitrogenous compound as an electron donor.

It is an additional object of the invention to provide processes for preparing catalyst systems as described and claimed herein.

It is a further object of the invention to provide a method for preparing polyolefins or other polymers deriving from the polymerization of addition polymerizable monomers containing one or more degrees of unsaturation, using a Ziegler-Natta catalyst and an unsaturated nitrogenous compound as described herein as an internal electron donor.

It is yet a further object of the invention to provide a method for preparing polyolefins or other polymers deriving from the polymerization of addition polymerizable monomers containing one or more degrees of unsaturation, using a Ziegler-Natta catalyst and an unsaturated nitrogenous compound as described herein as an external electron donor.

Additional objects, advantages and novel features of the invention will be set forth in part in the description which follows, and in part will become apparent to those skilled in the art upon examination of the following, or may be learned by practice of the invention.

In one aspect of the invention, then, a novel catalyst system is provided comprised of a supported Ziegler-Natta catalyst and an unsaturated nitrogenous compound as an electron donor. The unsaturated nitrogenous compound has the structural formula (I)

wherein A is a first coordinating segment containing a coordinating nitrogen atom within a C=N group, L is a substituted or unsubstituted lower hydrocarbylene linking group, m is zero or 1, and A' is a second coordinating segment containing a second coordinating atom selected from the group consisting of N, O, S and P. When the second coordinating atom is N, it may or may not be contained within a C=N group. Each C=N group may be a true imine functionality contained within an acyclic molecular segment, or may represent a linkage within a heterocycle such as a pyridine or pyrimidine ring. Exemplary compounds encompassed by the structure of formula (I) include those having structure (II)

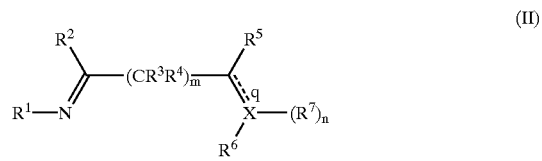

wherein:

m and n are independently zero or 1;

q is an optional double bond;

X is N, O, S or P, with the provisos that (a) when X is N or P, then either n is 1 or q is present as a double bond, but not both, and (b) when X is O or S, then n is zero and q is absent;

$R^1$, $R^6$, and $R^7$ are independently hydrido, hydrocarbyl or substituted hydrocarbyl, and $R^2$ and $R^5$ are independently hydrido, halo, hydrocarbyl or substituted hydrocarbyl, or $R^1$ and $R^2$ and/or $R^5$ and $R^6$ may be taken together to form a linkage —Q—, resulting in a five- or six-membered ring, wherein Q is —$[(CR)_a(Z)_b]$— in which a is 2, 3 or 4, Z is N, O or S, b is zero or 1, the sum of a and b is 3 or 4, and R is selected from the group consisting of hydrido, halo, hydrocarbyl, hydrocarbyloxy, trialkylsilyl, $NR^8_2$, $OR^9$, and $NO_2$, wherein $R^8$ and $R^9$ are each independently hydrocarbyl, or wherein R moieties on adjacent carbon atoms may be linked to form an additional five- or six-membered ring, or $R^2$ and $R^5$ may together form a linkage —Q— as just defined; and $R^3$ and $R^4$ are independently selected from the group consisting of hydrido and hydrocarbyl.

One subset of such unsaturated nitrogenous compounds useful as electron donors herein are bipyridyl compounds having the structure of formula (III)

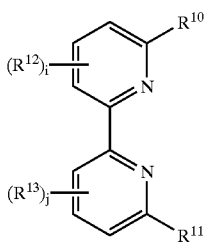
(III)

In formula (III), i and j are independently zero, 1, 2 or 3, and $R^{10}$, $R^{11}$, $R^{12}$ and $R^{13}$ are independently hydrido, hydrocarbyl or substituted hydrocarbyl, as defined for $R^1$.

In another aspect of the invention, a novel method is provided for preparing a catalyst system comprised of a Ziegler-Natta catalyst and an unsaturated nitrogenous compound as an internal electron donor, wherein the method involves admixing the electron donor with the Ziegler-Natta catalyst or components thereof during manufacture of the catalyst system.

In a further aspect of the invention, a novel method is provided for catalyzing polymerization of addition polymerizable monomers such as olefins, wherein the method involves contacting the addition polymerizable monomers, under polymerization conditions, with (1) a Ziegler-Natta catalyst system containing or prepared with an unsaturated nitrogenous compound as an internal electron donor, and/or (2) a Ziegler-Natta catalyst and, separately, an unsaturated nitrogenous compound as an external electron donor.

DETAILED DESCRIPTION OF THE INVENTION

Definitions and Nomenclature

Before the present compounds, compositions and methods are disclosed and described, it is to be understood that unless otherwise indicated this invention is not limited to specific molecular structures, ligands, or the like, as such may vary. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "an electron donor" includes one or more electron donors, reference to "a monomer" includes mixtures of different monomers, and the like.

The term "electron donor" or "electron-donating compound" refers to a compound that donates a pair of electrons, e.g., to an organometallic compound or complex used as a polymerization catalyst. Electron donors can be used in two ways in the formation of a Ziegler-Natta catalyst system and use thereof. An "internal" electron donor is used in the formation of the catalyst, while an "external" electron donor (also termed a "selectivity control agent") is used in the polymerization reaction. The electron donors herein may be used as internal donors, external donors, or both.

The term "alkyl" as used herein refers to a branched or unbranched saturated hydrocarbon group of 1 to approximately 24 carbon atoms, typically 1 to approximately 12 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkenyl" as used herein refers to a branched or unbranched hydrocarbon group of 2 to approximately 24 carbon atoms, typically 2 to approximately 12 carbon atoms, containing at least one carbon-carbon double bond, such as ethenyl, n-propenyl, isopropenyl, n-butenyl, isobutenyl, t-butenyl, octenyl, decenyl, tetradecenyl, hexadecenyl, eicosenyl, tetracosenyl and the like. Preferred alkenyl groups herein contain 2 to 12 carbon atoms and 2 to 3 carbon-carbon double bonds. The term "lower alkenyl" intends an alkenyl group of 2 to 6 carbon atoms, preferably 2 to 4 carbon atoms, containing one —C=C— bond. The term "cycloalkenyl" intends a cyclic alkenyl group of 3 to 8, preferably 5 or 6, carbon atoms.

The term "alkynyl" as used herein refers to a branched or unbranched hydrocarbon group of 2 to approximately 24 carbon atoms, typically 2 to approximately 12 carbon atoms, containing at least one —C≡C— bond, such as ethynyl, n-propynyl, isopropynyl, n-butynyl, isobutynyl, t-butynyl, octynyl, decynyl and the like. The term "lower alkynyl" intends an alkynyl group of 2 to 6, preferably 2 to 4, carbon atoms, and one —C≡C— bond.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing 1 to 6, more preferably 1 to 4, carbon atoms. Similarly, the term "alkenyloxy" as used herein intends an alkenyl group bound through a single, terminal ether linkage, and "alkynyloxy" refers to an alkynyl group bound through a single, terminal ether linkage.

The term "aryl" as used herein refers to an aromatic species containing 1 to 5 aromatic rings, either fused or linked, and either unsubstituted or substituted with 1 or more substituents typically selected from the group consisting of —(CH$_2$)$_x$—NH$_2$, —(CH$_2$)$_x$—COOH, —NO$_2$, halogen, alkyl, alkenyl, alkynyl, alkoxy, alkenyloxy, alkynyloxy, alkylthio, aryl, aralkyl, and the like, where x is an integer in the range of 0 to 6 inclusive as outlined above. Preferred aryl substituents contain 1 to 3 fused aromatic rings, and particularly preferred aryl substituents contain 1 aromatic ring or 2 fused aromatic rings. The terms "aralkyl" and "alkaryl" refer to moieties containing both alkyl and aryl species, typically containing less than about 24 carbon atoms, and more typically less than about 12 carbon atoms in the alkyl segment of the moiety, and typically containing 1 to 5 aromatic rings. The term "aralkyl" refers to aryl-substituted alkyl groups, while the term "alkaryl" refers to alkyl-substituted aryl groups. The terms "aralkylene" and "alkarylene" are used in a similar manner to refer to aryl-substituted alkylene and alkyl-substituted arylene moieties.

The term "heterocyclic" refers to a five- or six-membered monocyclic structure or to an eight- to eleven-membered bicyclic structure which is either saturated or unsaturated. Each heterocycle consists of carbon atoms and from one to four heteroatoms selected from the group consisting of nitrogen, oxygen and sulfur. As used herein, the terms "nitrogen heteroatoms" and "sulfur heteroatoms" include any oxidized form of nitrogen and sulfur, and the quaternized form of any basic nitrogen. Examples of heterocyclic groups include piperidinyl, pyrazinyl, morpholinyl and pyrrolidinyl.

"Halo" or "halogen" refers to fluoro, chloro, bromo or iodo, and usually relates to halo substitution for a hydrogen atom in an organic compound. Of the halos, chloro and fluoro are generally preferred.

"Hydrocarbyl" refers to univalent unsubstituted and substituted hydrocarbyl radicals containing 1 to about 24 carbon atoms, typically 1 to about 12 carbon atoms, including branched or unbranched, saturated or unsaturated species, such as alkyl groups, alkenyl groups, aryl groups, heteroaryl groups, and the like. The term "lower hydrocarbyl" intends a hydrocarbyl group of one to six carbon atoms, preferably one to four carbon atoms. The term "hydrocarbylene" intends a divalent unsubstituted or unsubstituted hydrocarbyl containing 1 to about 24 carbon atoms, including branched or unbranched, saturated or unsaturated species, or the like. The term "lower hydrocarbylene" intends a hydrocarbylene group of one to six carbon atoms, preferably one to four carbon atoms. The term "hydrocarbyloxy" or "hydrocarbylthio" refer to a hydrocarbyl group bound through a terminal ether or thio linkage.

By "substituted" as in "substituted hydrocarbyl" or "substituted hydrocarbylene" is meant that the hydrocarbyl or hydrocarbylene group contains one or more substituent groups which are inert under the process conditions to which the compound containing these groups is subjected. The substituent group may replace a hydrogen atom or may be found as a linkage within the carbon chain. "Monosubstituted" refers to a hydrocarbyl or hydrocarbylene group having one substituent group and "disubstituted" refers to a hydrocarbyl or hydrocarbylene group containing two substituted groups. The substituent groups also do not substantially interfere with the process. Included in the meaning of "substituted" are heteroaromatic rings. Examples of substituents include, but are not limited to, amino (including primary amino and alkyl-substituted, typically lower alkyl-substituted, secondary and tertiary amino), alkyl (typically lower alkyl), alkoxy (typically lower alkoxy), alkenyl (typically lower alkenyl), aryl (e.g., phenyl), halo, haloalkyl, imino, nitro, and the like; "substituted" also refers to the replacement of a carbon atom in a hydrocarbyl or hydrocarbylene group with a non-hydrocarbyl linkage such as —O—, —S—, —NH—, —N(alkyl)-, etc.

The term "unsaturated nitrogenous compound" refers to a compound having a C=N moiety. Unsaturated nitrogenous compounds herein include both a true imine wherein the C=N moiety is present in an acyclic molecular segment, as well as nitrogenous heterocycles in which the carbon-nitrogen bond is present in an aromatic ring, e.g., as in pyridine, pyrimidine, pyrazine, and the like.

The term "stereoregularity" is used in the conventional sense to refer to the relative positioning of substituent groups of monomer units in a polymer chain. The term "stereostructure" refers to the stereoregularity of any particular polymer. Possible polymeric stereostructures include the following: atactic polymers, in which the arrangement of substituents is random; isotactic polymers, in which all substituents are identically oriented; syndiotactic polymers, in which the orientation of substituents alternates; stereoblock polymers, containing blocks of monomers all oriented the same way, and blocks of monomers all oriented in a different way; isoblock polymers, containing blocks of isotactic monomer units separated by a single oppositely oriented monomer unit; hemiisotactic polymers, having every other monomer unit oriented in the same way (isotactic), separated by a monomer that is randomly oriented; and hemisyndiotactic polymers having every other monomer unit oriented in the opposite way (syndiotactic), separated by a randomly oriented monomer unit. Use of the electron donors provided herein significantly reduces the amount of atactic material in the polymer product.

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

As used herein all reference to the Periodic Table of the Elements and groups thereof is to the version of the table published by the Handbook of Chemistry and Physics, CRC Press, 1995, which uses the IUPAC system for naming groups.

The Novel Catalyst System

In one embodiment, the invention provides a novel catalyst system in the form of a supported Ziegler-Natta catalyst comprised of a transition metal component and an organoaluminum cocatalyst in association with an unsaturated nitrogenous compound as an electron donor. The unsaturated nitrogenous compound has the structure of formula (I)

$$A\text{---}(L)_m\text{---}A' \tag{I}$$

wherein m is zero or 1, and A, L and A' are defined as follows.

The molecular segment "A" represents an unsaturated nitrogenous moiety. More particularly, A is a first coordinating segment containing a coordinating nitrogen atom within a C=N group. The C=N group may be a true imine functionality contained within an acyclic molecular segment, or it may represent a linkage within a heterocycle such as a pyridine or pyrimidine ring. Preferred A moieties have the structures

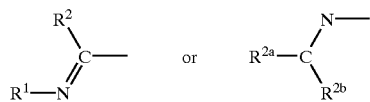

wherein $R^1$ is hydrido, unsubstituted hydrocarbyl or substituted hydrocarbyl, including but not limited to, linear, branched or cyclic alkyl, alkenyl or alkynyl, aryl, alkaryl, aralkyl, heteroaryl, optionally substituted at one or more available carbon atoms with a nonhydrogen substituent such as halo, haloalkyl, alkoxy, hydroxyl, carboxyl, amino, mono(alkyl)substituted amino, di(alkyl)substituted amino, imino, nitro, trialkylsilyl, etc., and optionally containing one or more nonhydrocarbyl linkages such as —O—, —S—, —NH—, —N(alkyl)- and the like. When $R^1$ is other than hydrido, it will generally comprise 1 to 24 carbon atoms, more typically 1 to 12 carbon atoms; further, when $R^1$ does not comprise a cyclic alkyl, aryl or heterocyclic substituent, it is preferably lower hydrocarbyl such as lower alkyl, lower alkenyl, or the like. $R^2$, $R^{2a}$ and $R^{2b}$ are hydrido, halo or optionally substituted hydrocarbyl, with suitable hydrocarbyl moieties as defined for $R^1$, and wherein $R^{2a}$ and $R^{2b}$ may be linked to form five- or six-membered alicyclic ring optionally containing 1, 2 or 3 heteroatoms, e.g., N, S, O or P, generally N or O. $R^1$ and $R^2$ may also be linked through a linkage —Q—, resulting in a five- or six-membered ring, wherein Q is —[$(CR)_a(Z)_b$]— in which a is 2, 3 or 4, Z is N, O or S, b is zero or 1, the sum of a and b is 3 or 4, and R is selected from the group consisting of hydrido, halo, hydrocarbyl, hydrocarbyloxy, trialkylsilyl, $NR^8_2$, $OR^9$, and $NO_2$, wherein $R^8$ or $R^9$ are each independently hydrocarbyl, or wherein R moieties on adjacent carbon atoms may be linked to form an additional five- or six-membered ring.

A' is a second coordinating segment containing a second coordinating atom selected from the group consisting of N, O, S and P. If the second coordinating atom is N, it may or may not be contained in a N=N group. A' may be comprise virtually any molecular moiety which provides the aforementioned second coordinating atom within an optimum distance from the first coordinating atom in segment A; the "optimum distance" is such that one, two or three atoms may be present in a linear linkage between the first coordinating atom of segment A and the second coordinating atom of segment A'. A' may be, for example, —OH, —SH, —COOH, —OR$^{14}$, —SR$^{14}$, —COOR$^{14}$,

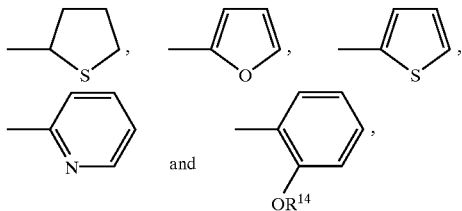

wherein R$^{14}$ is lower alkyl, and wherein any of the foregoing cyclic moieties may be substituted at an available carbon atom with a nonhydrogen substituent;

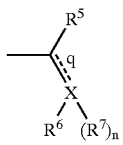

wherein n is zero or 1, q is a single or double bond, X is N, O, S or P, R$^5$ is as defined for R$^2$, and R$^6$ and R$^7$ are as defined for R$^1$, with the proviso that (a) when X is N or P, then either n is 1 or q is a double bond, but not both, and (b) when X is O or S, then n is zero and q is a single bond, and wherein R$^5$ and R$^6$ may be linked to form —Q— as explained with respect to the possible linkage of R$^1$ and R$^2$ in molecular segment A; or

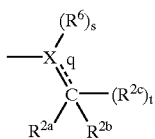

wherein s and t are independently zero or 1, q, X, R$^{2a}$, R$^{2b}$ and R$^6$ are as defined above, and R$^{2c}$ is as defined for R$^{2a}$ and R$^{2b}$, with the proviso that (a) when X is N or P, then either s is zero or q is a double bond, (b) when X is O or S, then s is zero and q is a single bond, and (c) when q is a double bond, t is zero; while when q is a single bond, then t is 1.

L is hydrocarbylene, preferably lower hydrocarbylene, either substituted or unsubstituted, and most preferably is substituted or unsubstituted methylene —CR$^3$R$^4$— wherein R$^3$ and R$^4$ are hydrido or hydrocarbyl, preferably hydrido or alkyl, and most preferably hydrido or lower alkyl.

Exemplary unsaturated nitrogenous compounds useful as electron donors herein have the structure of formula (II)

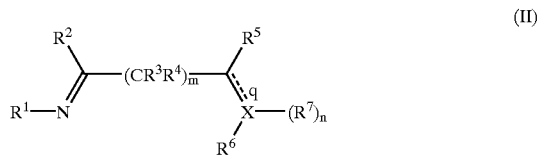

In formula (II), the subscripts m and n are independently zero or 1, preferably are both zero, and letter "q" represents an optional double bond.

X is N, O, S or P, with the provisos that (a) when X is N or P, then either n is 1 or q is present as a double bond, but not both, and (b) when X is O or S, then n is zero and q is absent.

R$^1$, R$^6$ and R$^7$ are independently hydrido, hydrocarbyl or substituted hydrocarbyl, as defined above, and R$^2$ and R$^5$ are independently hydrido, halo, hydrocarbyl or substituted hydrocarbyl, also as defined above, or R$^1$ and R$^2$ and/or R$^5$ and R$^6$ may be taken together to form a linkage —Q—, resulting in a five- or six-membered cyclic group. Similarly, R$^2$ and R$^5$ may together form a linkage —Q—. As explained above, Q is —[(CR)$_a$(Z)$_b$]— in which a is 2, 3 or 4, Z is N, O or S, b is zero or 1, the sum of a and b is 3 or 4, and R is selected from the group consisting of hydrido, halo, hydrocarbyl, hydrocarbyloxy, trialkylsilyl, NR$^8_2$, OR$^9$, and NO$_2$, wherein R$^8$ or R$^9$ are each independently hydrocarbyl, or wherein R moieties on adjacent carbon atoms may be linked to form an additional five- or six-membered ring.

Examples of R$^1$, R$^6$ and R$^7$ thus include, but are not limited to, hydrido, methyl, ethyl, n-propyl, isopropyl, methoxy, ethoxy, isopropoxy, phenyl, benzyl, phenoxy, pyridyl, diisopropylphenyl, methoxyphenyl, trimethylsilyl, triethylsilyl, and the like; R$^2$ and R$^5$ substituents can include any of the foregoing as well as halogen substituents, i.e., chloro, fluoro, bromo and iodo, with chloro and fluoro preferred. When R$^1$ and R$^2$ and/or R$^5$ and R$^6$ are linked, the cyclic structures so formed may be alicyclic or aromatic, including, for example, furanyl, pyrrolyl, thiophenyl, imidazolyl, pyrazolyl, oxathiolyl, pyridinyl, methylpyridinyl, ethylpyridinyl, pyridazinyl, pyrimidinyl, pyrazinyl, piperidinyl, piperazinyl, morpholinyl, tetrahydrothiophenyl, tetrahydrofuranyl, tetrahydropyranyl, 1,4-dioxanyl, etc. When R$^2$ and R$^5$ are linked, the resulting structures are alicyclic and may or may not contain heteroatoms; such moieties include, for example, cyclopentane, cyclohexane, tetrahydrofuran, tetrahydropyran, tetrahydrothiophene, 1,4-dioxane, 1,2-dithiole, 1,3-dithiole, piperazine, morpholine, and the like.

R$^3$ and R$^4$ are independently selected from the group consisting of hydrido and hydrocarbyl, preferably hydrido or alkyl, most preferably hydrido or lower alkyl.

In one group of compounds having the general structure of formula (II), m and n are zero, X is N, and q represents a double bond, so that the compound has the structure (IV)

in which R$^1$, R$^2$, R$^5$ and R$^6$ are as defined previously.

Another group of compounds having the structure of formula (II) (and encompassed by formula (IV) as well) are bipyridyl compounds having the structure of formula (III)

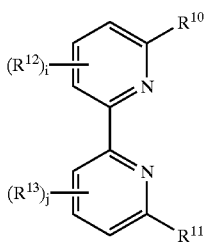
(III)

Exemplary compounds within this group are wherein i and j are zero and $R^{10}$ and $R^{11}$ are lower alkyl, i.e., 3,3'-di(lower alkyl)-2,2'-bipyridine, including, for example, 3,3'-dimethyl-2,2'-bipyridine.

In another group of compounds encompassed by structural formula (II), m and n are zero, X is O, and q is absent, such that the compound has the structure of formula (V)

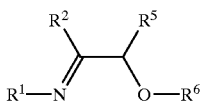
(V)

wherein $R^1$, $R^2$, $R^5$ and $R^6$ are as defined previously, particularly with respect to compounds of formula (IV).

Specific electron donors herein include, but are not limited to, the following:

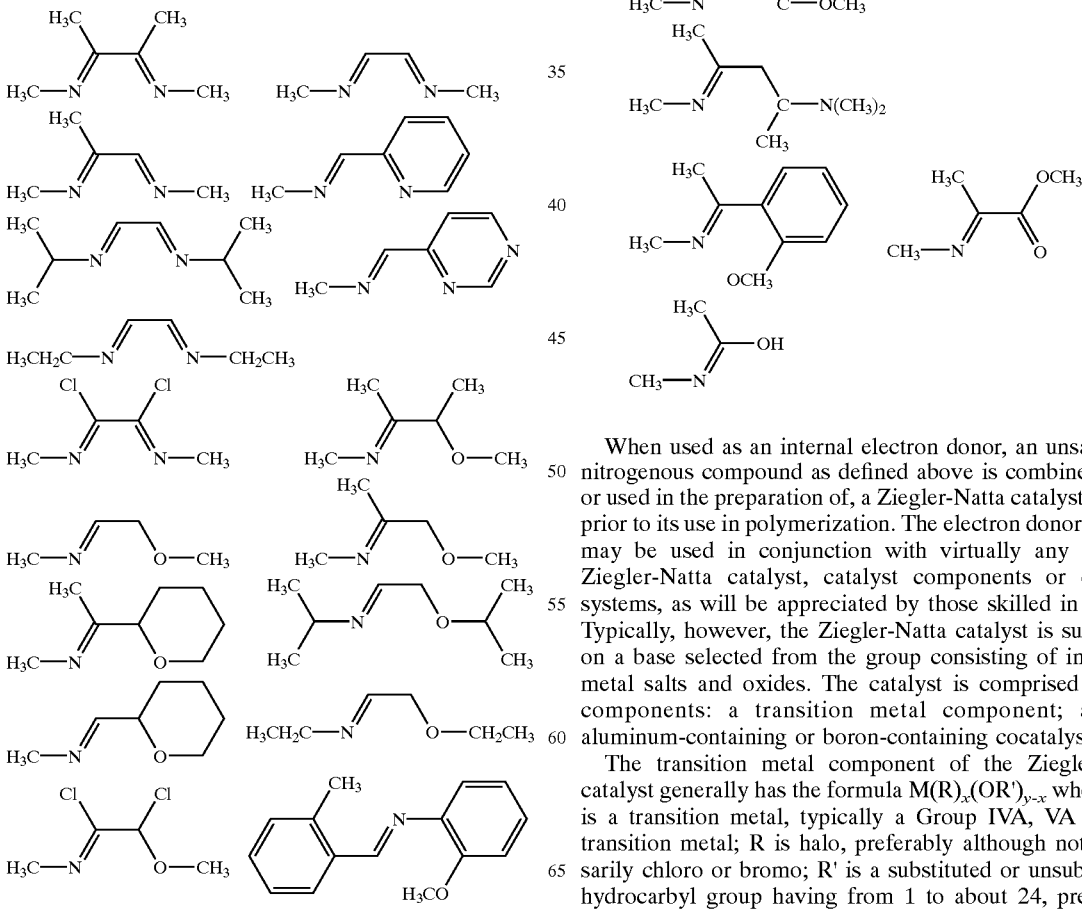

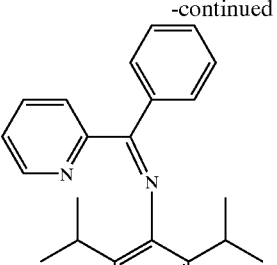

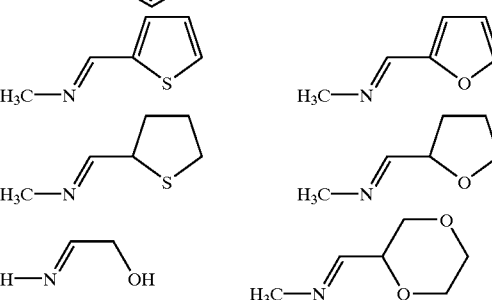

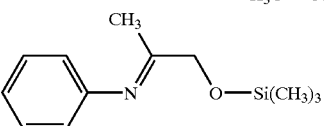

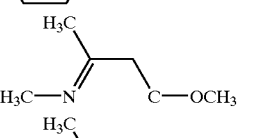

When used as an internal electron donor, an unsaturated nitrogenous compound as defined above is combined with, or used in the preparation of, a Ziegler-Natta catalyst system prior to its use in polymerization. The electron donors herein may be used in conjunction with virtually any type of Ziegler-Natta catalyst, catalyst components or catalyst systems, as will be appreciated by those skilled in the art. Typically, however, the Ziegler-Natta catalyst is supported on a base selected from the group consisting of inorganic metal salts and oxides. The catalyst is comprised of two components: a transition metal component; and an aluminum-containing or boron-containing cocatalyst.

The transition metal component of the Ziegler-Natta catalyst generally has the formula $M(R)_x(OR')_{y-x}$ wherein M is a transition metal, typically a Group IVA, VA or VIA transition metal; R is halo, preferably although not necessarily chloro or bromo; R' is a substituted or unsubstituted hydrocarbyl group having from 1 to about 24, preferably from 1 to about 10 carbon atoms; y is the valence state of M, and x is an integer in the range of 0 to y. Preferably, x is less than y, so that at least one of the halo substituents is replaced with an OR' moiety. Most preferably, although again, not necessarily, M is titanium, vanadium, zirconium, chromium or hafnium. Exemplary transition metal components thus include, without limitation, tetramethyl zirconium, tetramethyl titanium, tetrabenzyl titanium, tetrabenzyl zirconium, tetrakis (dimethyl amido) titanium, tetrakis (dimethyl amido) zirconium, vanadium trichloride, chromium trioxide and triallyl chromium, tetra-n-butoxy titanium, tetra (isopropoxy)titanium, tetraethoxy titanium, di-n-butoxy titanium dichloride, monoethoxy titanium trichloride, tetraphenoxy titanium, triethoxy titanium chloride, triisopropoxy titanium chloride, diethoxy titanium dibromide, titanium tetrachloride, titanium tetrabromide, titanium tetraiodide, tetraethoxy hafnium, tetraethoxy zirconium, triethoxy zirconium bromide, triisopropoxy hafnium chloride, di-n-butoxy zirconium dichloride, vanadium tetrachloride, vanadium tetrabromide, zirconium tetrachloride, zirconium tetrabromide, and the like. Mixtures of such components may also be used in a single catalyst system, as will be appreciated by those skilled in the art.

The cocatalyst, if aluminum-containing, will generally be an organoaluminum compound. Suitable organoaluminum cocatalysts include aluminum trialkyl compounds $AlR''_3$ wherein R" is $C_1$–$C_{12}$ alkyl, such as, for example, triethylaluminum, trimethylaluminum, triisobutylaluminum, trihexylaluminum, trioctylaluminum and the like. Other organoaluminum cocatalysts are aluminoxanes $Al(O)R_2$ wherein R is an alkyl group having from 1 to about 8 carbon atoms and x has a value greater than about 5, e.g., methylaluminoxane ("MAO"), hexaisobutyl aluminoxane, tetraisobutyl aluminoxane and polymethylaluminoxane. Other suitable organoaluminum compounds may serve as cocatalysts as well, however, including alkyl aluminum halides such as diethylaluminum chloride, diethylaluminum bromide, methylethylaluminum chloride, etc.; alkyl aluminum hydrides; and alkyl siloxalanes. If boron-containing, the cocatalyst will typically be a fluorohydrocarbylboron compound such as tetra(pentafluorophenyl)borate, sodium tetrakis[(bis-3,5-trifluoromethyl)phenyl]borate, $H^+(OCH_2CH_3)_2$[(bis-3,5-trifluoromethyl)phenyl]borate, trityltetra(pentafluorophenyl)borate or tris(pentafluorophenyl)boron. The relative amounts of cocatalyst and transition metal component that are used are such that the atomic ratio of Al (or B) to M (e.g., Zr, Hf, etc.) is from about 0.1:1 to about 2000:1, preferably from about 1:1 to about 1000:1, more preferably from about 5:1 to about 500:1, and most preferably from about 5:1 to about 200:1.

The Ziegler-Natta catalyst is supported on a base generally selected from the group consisting of inorganic metal oxides and salts, e.g., silica, magnesium salts and oxides, manganese salts and oxides. Combinations of such compounds may also be used. Magnesium and manganese salts and oxides are preferably employed, alone or in combination with other compounds, e.g., silica, aluminum salts, or the like. Particularly preferred magnesium and manganese salts and oxides include, for example, magnesium and manganese dihalides, alkyl oxides, aryl oxides and combinations thereof. Particularly preferred support bases are the magnesium dialkoxides, halo magnesium alkoxides and magnesium dihalides. Illustrative but nonlimiting examples of suitable support bases include $MgCl_2$, $MgCl_2/AlCl_3$, $MgCl_2/SiO_2$, $MgBr_2$, $Mg(OCH_3)_2$, $Mg(OCH_2CH_3)_2$, $Mg(OC_6H_5)_2$ and combinations thereof. In accordance with the preferred embodiments of this invention, the magnesium halides and especially magnesium dichloride are used to form the support material. The solid support is particulate in nature, and preferably has a median particle diameter from about 0.1 $\mu$m to about 500 $\mu$m, more preferably from about 1 $\mu$m to about 150 $\mu$m, and most preferably from about 5 $\mu$m to about 100 $\mu$m. The amount of support material in the catalyst system is such that an atomic ratio of Mg or Mn in the support, to Al (or B) in the cocatalyst, is greater than 0.3 to 1, and preferably is in the range of approximately 0.5:1 to 10:1.

The preferred method for producing the catalyst system of the invention in this embodiment, i.e., wherein the unsaturated nitrogenous compound serves as an "internal" electron donor, comprises comminution of all components, i.e., the transition metal component, the aluminum-containing or boron-containing cocatalyst, the support material, and the electron donor. This may be accomplished using any methodology and equipment known and available to those skilled in the art. Generally, admixture and comminution of the ingredients is carried out under an inert atmosphere in a ball or vibration mill. Initially, it is preferred that the support base is charged into the mill; if the support base material contains water which must be removed, a sufficient quantity of dehydrating agent is initially added to the support base. Although comminution may take place at temperatures between about 0° C. and about 90° C., the preferred mixing temperature is from about 25° C. to about 50° C. Mixing times may range from about 15 minutes to about 48 hours. Preferred mixing times are from about 12 hours to about 20 hours, optimally about 16 hours.

Another suitable technique is a precipitation method that typically involves: (1) admixing $R_2Mg$ (R=alkyl, alkoxide, carboxylate) with $MCl_4$ (M=transition metal) in a hydrocarbon solvent to precipitate the solid catalyst intermediate, and (2) treating the intermediate so formed with a second transition metal compound (often $TiCl_4$ or $TiMe_4$) and an electron donor to form the catalyst system. The catalyst system is then activated using a typical catalyst activator, e.g., an aluminum alkyl or MAO. As will be appreciated by those skilled in the art, there are a number of variables that may be optimized using routine procedures to produce a desired catalyst system, including method/order of addition, stirring speed, mixing temperature (typically 25° C.–130° C.), and the like; optimal conditions depend on the reagents used.

The present invention is thus premised in part on the discovery that using an unsaturated nitrogenous compound as an internal electron donor in a Ziegler-Natta catalyst system, particularly a monoimine, a diimine or a bipyridyl compound, significantly improves catalyst efficiency and reduces formation of atactic product. That is, catalyst efficiency is substantially higher than that seen with prior Ziegler-Natta catalyst systems, with or without electron donors that have been used previously, including esters, ethers, ketones, lactones, alkoxysilanes, and the like. Furthermore, the properties of the polymer product are far superior, as a result of the increase in stereoregularity. Stereoregular polymers typically have high crystallinity, which is in turn a prime determinant of key physical properties such as stiffness, solvent resistance, and melting temperature. The fact that the present catalyst systems are highly efficient and prepare polymers having high stereoregularity is a significant advantage of the invention.

External Electron Donors

In an alternative embodiment of the invention, unsaturated nitrogenous compounds as described earlier herein are used as external electron donors. That is, they are incorporated into a polymerization reaction either during polymerization or immediately prior to polymerization. The catalyst system that is used is a Ziegler-Natta catalyst system described in the preceding section, i.e., a catalyst system comprised of a supported Ziegler-Natta catalyst having a transition metal component and an aluminum-containing or boron-containing cocatalyst. In this embodiment, however, the unsaturated nitrogenous compound may not be present in the initial catalyst system, and thus represents an "external" electron donor.

Polymerization

In another embodiment of the invention, a process is provided for polymerizing addition polymerizable monomers using either (1) a catalyst system as described herein containing an unsaturated nitrogenous compound as an internal electron donor, and/or (2)an unsaturated nitrogenous compound as an external electron donor. The addition polymerizable monomers contain one or more degrees of unsaturation. Olefinic or vinyl monomers are preferred, and particularly preferred monomers are α-olefins having from about 2 to about 20 carbon atoms, such as, for example, linear or branched olefins including ethylene, propylene, 1-butene, 3-methyl-1-butene, 1,3-butadiene, 1-pentene, 4-methyl-1-pentene, 1-hexene, 4-methyl-1-hexene, 1,4-hexadiene, 1,5-hexadiene, 1-octene, 1,6-octadiene, 1-nonene, 1-decene, 1,4-dodecadiene, 1-hexadecene, 1-octadecene, and mixtures thereof. Cyclic olefins and diolefins may also be used; such compounds include, for example, cyclopentene, 3-vinylcyclohexene, norbornene, 5-vinyl-2-norbornene, 5-ethylidene-2-norbornene, dicyclopentadiene, 4-vinylbenzocyclobutane, tetracyclododecene, dimethano-octahydronaphthalene, and 7-octenyl-9-borabicyclo-(3,3,1)nonane. Aromatic monomers which may be polymerized include styrene, o-methylstyrene, m-methylstyrene, p-methylstyrene, p-tert-butylstyrene, m-chlorostyrene, p-chlorostyrene, p-fluorostyrene, indene, 4-vinylbiphenyl, acenaphthalene, vinylfluorene, vinylanthracene, vinylphenanthrene, vinylpyrene and vinylchrisene. Other monomers which may be polymerized include methylmethacrylate, ethylacrylate, vinyl silane, phenyl silane, trimethylallyl silane, acrylonitrile, maleimide, vinyl chloride, vinylidene chloride, tetrafluoroethylene, isobutylene, carbon monoxide, acrylic acid, 2-ethylhexylacrylate, methacrylonitrile and methacrylic acid.

In order to carry out the polymerization reaction, a catalytic amount of a catalyst system of the invention, containing an unsaturated nitrogenous compound as an internal electron donor, is brought into contact with the addition polymerizable monomers contained in a polymerization zone. Alternatively, a catalyst system is used which does not contain an internal electron donor, but wherein an unsaturated nitrogenous compound is added into the polymerization reaction as an external electron donor. In a further embodiment, an unsaturated nitrogenous compound is used as both an internal electron donor and an external electron donor in a single polymerization process. In any of the foregoing embodiments, polymerization may be carried out in the liquid or slurry phase, in which case reaction is carried out in the presence of an inert diluent, i.e., an inert organic diluent such as liquefied ethane, propane, isobutane, n-butane, n-hexane, isooctane, paraffinic mixtures of alkanes having from 8 to 12 carbon atoms, cyclohexane, methylcyclopentane, dimethylcyclohexane, dodecane, benzene, toluene, ethylbenzene, cumene, decalin, kerosene, naphthas, etc. Preferred polymerization temperatures are from about 60° C. to about 95° C., and preferred pressures generally range from 10 to 2000 atm. Polymerization may also take place in the gas phase, e.g., in a fluidized or stirred bed reactor, using temperatures in the range of approximately 60° C. to 120° C. and pressures in the range of approximately 10 to 1000 atm.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

Experimental

The following examples are put forth so as to provide those of ordinary skill in the art with a complete disclosure and description of how to prepare and use the catalysts of the invention. Efforts have been made to ensure accuracy with respect to numbers (e.g., amounts, temperature, etc.) but some errors and deviations should be accounted for. Unless indicated otherwise, parts are parts by weight, temperature is in °C. and pressure is at or near atmospheric.

The first five examples describe preparation of a catalyst system of the invention incorporating a variety of different internal electron donors. The next two examples describe a polymerization reactions using the method of the invention.

EXAMPLE 1

Preparation of a Catalyst System of the Invention Containing Imine (1) as an Internal Electron Donor This example describes preparation of a Ziegler-Natta catalyst system of the invention using imine (1) as an internal electron donor.

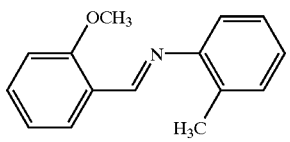

1

In a drybox, a polished ball mill container was loaded with 28.5 g MgCl$_2$, sealed and ball-milled at room temperature for 14 hours at 150 rpm. After storage for 1 day at room temperature, the container was returned to the drybox and opened. 4 g of TiCl$_4$ was added by pipet and the container resealed. The mixture was then ball-milled under the same conditions for 17.5 hours, quickly vented in the hood and transferred into the drybox. The resulting yellow powder was split into two fractions. A 16 g sample was transferred to a separate container for use in the following example and the remainder was treated with 0.40 g of (1) by pipet. Following addition of the internal donor, the mixture was ball-milled for 21 hours, transferred to the drybox and the resulting 12.5 g of orange product was collected. The resulting TiCl$_4$ in the catalyst was calculated to be 12.2 wt. %.

EXAMPLE 2

Preparation of a Catalyst System of the Invention Containing Imine (2) as an Internal Electron Donor In this example diimine (2) was added to the 16 g TiCl$_4$/MgCl$_2$ product of Example 1.

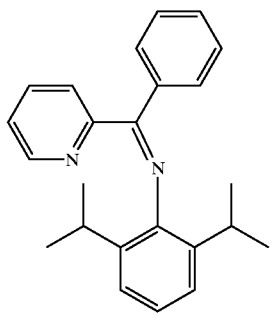

A textured ball mill container was charged with the 16 g sample of TiCl$_4$/MgCl$_2$ from the earlier experiment and 0.750 g of (2) was added by pipet. Following addition of the internal donor, the mixture was ball-milled for 21 hours at room temperature and 150 rpm. The resulting 12.6 g of yellow/cream powder was transfered to the drybox and collected. The resulting TiCl$_4$ was calculated to be 11.9 wt. %.

EXAMPLE 3

Preparation of a Catalyst System of the Invention Containing (3) as an Internal Electron Donor In this example a catalyst system of the invention is prepared using the diimine (3) as the internal electron donor.

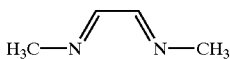

3

In a drybox, a polished ball mill container is loaded with 28.5 g MgCl$_2$ and a magnet, sealed and ball-milled at room temperature for 14 hours at 150 rpm. After storage for 1 day at room temperature, the container is returned to the drybox and opened. 4 g of TiCl$_4$ is added by pipet and the container resealed. The mixture is then ball-milled under the same conditions for 17.5 hours, quickly vented in the hood and transferred into the drybox. A 16 g sample is of the powder is treated with 0.50 g of (3) by pipet. Following addition of the internal donor, the mixture is ball-milled for 21 hours and transferred to the drybox where the resulting catalyst is collected.

EXAMPLE 4

Preparation of a Catalyst of the Invention Containing 2-(Methoxymethyl)pyridine as an Internal Electron Donor In this example a catalyst system of the invention is prepared using 2-(methoxymethyl)pyridine as the internal electron donor.

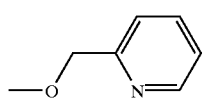

2-(methoxymethyl)pyridine

In a drybox, a polished ball mill container is loaded with 28.5 g MgCl$_2$ and a magnet, sealed and ball-milled at room temperature for 14 hours at 150 RPM. After storage for 1 day at room temperature, the container is returned to the drybox and opened. 4 g of TiCl$_4$ is added by pipet and the container resealed. The mixture is then ball-milled under the same conditions for 17.5 hours, quickly vented in the hood and transferred into the drybox. A 16 g sample is of the powder is treated with 0.50 g of 2-(methoxymethyl)pyridine by pipet. Following addition of the internal donor, the mixture is ball-milled for 21 hours and transferred to the drybox where the resulting catalyst is collected.

EXAMPLE 5

Preparation of a Catalyst System of the Invention Containing (4) as an Internal Electron Donor In this example a catalyst system of the invention is prepared using diimine (4) as an internal electron donor.

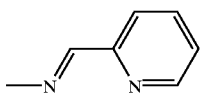

4

In a drybox, a polished ball mill container is loaded with 28.5 g MgCl$_2$ and a magnet, sealed and ball-milled at room temperature for 14 hours at 150 RPM. After storage for 1 day at room temperature, the container is returned to the drybox and opened. 4 g of TiCl$_4$ is added by pipet and the container resealed. The mixture is then ball-milled under the same conditions for 17.5 hours, quickly vented in the hood and transferred into the drybox. A 16 g sample is of the powder is treated with 0.50 g of (4) by pipet. Following addition of the internal donor, the mixture is ball-milled for 21 hours and transferred to the drybox where the resulting catalyst is collected.

EXAMPLE 6

Polymerization of Ethylene

The catalyst system prepared in Example 1 was used as the polymerization catalyst in the preparation of polyethylene ("PE"). Standard ethylene polymerization conditions were used, as follows:

Polymerization was conducted in a 300 mL autoclave reactor. Triethylaluminum (TEA) was used as co-catalyst with total Al/Ti ratio equal to 229. In a drybox a glass vial was charged with 0.015 g of the catalyst prepared in Example 1, 5 g of toluene, and 1 g of TEA. Prior to initiation of polymerization, the reactor was loaded with 150 mL of toluene. The reactor was set to 30° C. and pressurized with ethylene to 75 psig. The reactor was configured to maintain the set pressure and temperature during the polymerization reaction. The reaction was initiated by injection of the catalyst system. The reaction ran for 1 hour and was terminated by venting of the ethylene. The polymer was removed from the reactor, precipitated with acetone, washed with additional acetone, collected on a fritted glass filter and dried in a vacuum oven overnight. Yield, 19.2 g. $T_m$=136° C.; $M_w$=1.03×10$^7$; MWD=1.62.

EXAMPLE 7

Polymerization of Propylene

The catalyst prepared in Example 1 was is as the polymerization catalyst in the preparation of polypropylene. Standard propylene polymerization conditions are used, as follows:

Polymerization is conducted in a 300 mL autoclave reactor. Methyl aluminoxane (MAO) is used as co-catalyst with total Al/Ti ratio equal to 1000. In a drybox a glass vial is charged with 0.015 g of the catalyst prepared in Example 1, 5 g of toluene, and 1 g of MAO. Prior to initiation of polymerization, the reactor is loaded with 150 mL of toluene. The reactor is set to 30° C. and pressurized with ethylene to 75 psig. The reactor is configured to maintain the set pressure and temperature during the polymerization reaction. The reaction is initiated by injection of the catalyst system. The reaction runs for 1 hour and is terminated by venting of the propylene. The polymer is removed from the reactor, precipitated with acetone, washed with additional acetone, collected on a fritted glass filter and dried in a vacuum oven overnight.

What is claimed is:

1. A catalyst system for use in the polymerization of addition polymerizable monomers, comprising:
   (a) a supported Ziegler-Natta catalyst comprised of (i) a transition metal component having the formula $M(R)_x(OR')_{y-x}$ wherein M is a transition metal, R is halogen, R' is substituted or unsubstituted hydrocarbyl of 1 to 24 carbon atoms, y is the oxidation number of M, and x is an integer in the range of 0 to y, and (ii) an aluminum-containing or boron-containing cocatalyst; and
   (b) an electron donor comprising an unsaturated nitrogen containing compound having the structural formula (II)

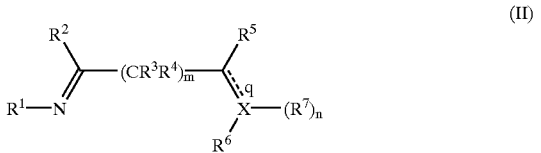

(II)

wherein
   $R^1$, $R_6$, and $R^7$ are hydrido or optionally substituted hydrocarbyl and $R^2$ and $R^5$ are hydrido, halogen or optionally substituted hydrocarbyl, or wherein $R^1$ and $R^2$ and/or $R^5$ and $R^6$ and/or $R^5$ and $R^7$ are linked to form a five- or six-membered saturated or unsaturated heterocyclic ring that may additionally contain other substitutents having heteroatoms selected from the group consisting of O, N and S, and which may be further substituted with moieties selected from the group consisting of halogen, hydrocarbyl, hydrocarbyloxy, trialkylsilyl, $NR^8_2$, $OR^9$, and $NO_2$, wherein $R^8$ and $R^9$ are each independently hydrocarbyl, and wherein the substitutes moieties on adjacent carbon atoms are optionally bonded to each other to form a different five- or six-membered ring;
   $R^3$ and $R^4$ are independently selected from the group consisting of hydrido and lower alkyl;
   n is zero or 1;
   m is zero or 1;
   q is a single or double bond; and
   X is N, O, S or P,
with the provisos that
   (a) when X is N or P, then either n is 1 or q is a double bond, but not both;
   (b) when X is N, m is 0, n is 0, and q is a double bond, then $R^1$, $R^2$, $R^5$ and $R^6$ are independently hydrido, hydrocarbyl or substituted hydrocarbyl; and
   (c) when X is O or S, then n is zero and q is a single bond.

2. The catalyst system of claim 1, wherein M is a Group 4, 5, or 6 transition metal.

3. The catalyst system of claim 2, wherein M is selected from the group consisting of titanium, vanadium, zirconium and hafnium.

4. The catalyst system of claim 3, wherein M is titanium.

5. The catalyst system of claim 4, wherein x is 1, 2 or 3.

6. The catalyst system of claim 1, wherein the cocatalyst is aluminum-containing.

7. The catalyst system of claim 6, wherein the cocatalyst is an organoaluminum compound.

8. The catalyst system of claim 7, wherein the organoaluminum cocatalyst is an aluminum trialkyl compound.

9. The catalyst system of claim 8, wherein the aluminum trialkyl compound has the formula $Al(R)_3$ wherein the R are independently selected from the group consisting of $C_1$–$C_{12}$ alkyl.

10. The catalyst system of claim 9, wherein the aluminum trialkyl compound is selected from the group consisting of trimethylaluminum, triethylaluminum and triisobutylaluminum.

11. The catalyst system of claim 7, wherein the organoaluminum compound is an aluminoxane.

12. The catalyst system of claim 11, wherein the aluminoxane is methyl aluminoxane.

13. The catalyst system of claim 1, wherein the Ziegler-Natta catalyst is present on a support comprised of an inorganic oxide or an inorganic halide.

14. The catalyst system of claim 13, wherein the support is comprised of an inorganic halide.

15. The catalyst system of claim 14, wherein the support is magnesium-containing.

16. The catalyst system of claim 15, wherein the support is comprised of a magnesium halide.

17. The catalyst system of claim 16, wherein the magnesium halide is magnesium dichloride.

18. The catalyst system of claim 1, wherein the electron donor (II) has the structure of formula (IV)

(IV)

wherein $R^1$, $R^2$, $R^5$ and $R^6$ are independently hydrido, hydrocarbyl or substituted hydrocarbyl.

19. The catalyst system of claim 18, wherein $R^1$, $R^2$, $R^5$ and $R^6$ are independently hydrido or $C_{1-4}$ alkyl.

20. The catalyst system of claim 1, wherein the electron donor (II) has the structure of formula (V)

(V)

wherein $R^1$, $R^2$, $R^5$ and $R^6$ are as defined in claim 1.

21. The catalyst system of claim 20, wherein $R^1$, $R^2$, $R^5$ and $R^6$ are independently hydrido, hydrocarbyl or substituted hydrocarbyl.

22. The catalyst system of claim 21, wherein $R^1$, $R^2$, $R^5$ and $R^6$ are independently hydrido or $C_{1-4}$ alkyl.

23. A process for preparing a catalyst system useful for the polymerization of addition polymerizable monomers, comprising:
   (a) providing a transition metal component of a Ziegler-Natta catalyst, said component having the formula $M(R)_x(OR')_{y-x}$ wherein M is a transition metal, R is halogen, R' is a substituted or unsubstituted hydrocarbyl of 1 to 24 carbon atoms, y is the oxidation number of M, and x is an integer in the range of 0 to y;

(b) admixing the transition metal component with an aluminum-containing or boron-containing cocatalyst to form a Ziegler-Natta catalyst; and (c) introducing into the admixture, either during or after step (b), (i) a support material comprising an inorganic oxide or an inorganic halide, and (ii) an electron donor comprising an unsaturated nitrogen containing compound having the structural formula (II)

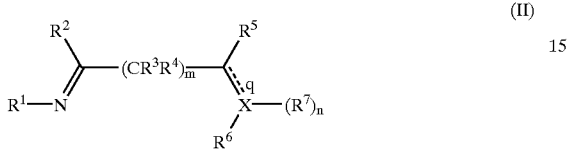

wherein $R^1$, $R^6$, and $R^7$ are hydrido or optionally substituted hydrocarbyl and $R^2$ and $R^5$ are hydrido, halogen or optionally substituted hydrocarbyl, or wherein $R^1$ and $R^2$ and/or $R^5$ and $R^6$ and/or $R^5$ and $R^7$ are linked to form a five- or six-membered saturated or unsaturated heterocyclic ring that may additionally contain other substituents having heteroatoms selected from the group consisting of O, N and S, and which may be further substituted with moieties selected from the group consisting of halogen, hydrocarbyl, hydrocarbyloxy, trialkylsilyl, $NR^8_2$, $OR^9$, and $NO_2$, wherein $R^8$ and $R^9$ are each independently hydrocarbyl, and wherein the substituted moieties on adjacent carbon atoms are optionally bonded to each other to form a different five- or six-membered ring;

$R^3$ and $R^4$ are independently selected from the group consisting of hydrido and lower alkyl;

n is zero or 1;

m is zero or 1;

q is a single or double bond; and

X is N, O, S or P, with the provisos that (a) when X is N or P, then either n is 1 or q is a double bond, but not both;

(b) when X is N, m is 0, n is 0, and q is a double bond, then $R^1$, $R^2$, $R^5$ and $R^6$ are independently hydrido, hydrocarbyl or substituted hydrocarbyl; and (c) when X is O or S, then n is zero and q is a single bond.

24. A catalyst system for use in the polymerization of addition polymerizable monomers, comprising:

(a) a supported Ziegler-Natta catalyst comprised of (i) a transition metal component having the formula $M(R)_x(OR')_{y-x}$ wherein M is a transition metal, R is halogen, R' is substituted or unsubstituted hydrocarbyl of 1 to 24 carbon atoms, y is the oxidation number of M, and x is an integer in the range of 0 to y, and (ii) an aluminum containing or boron-containing cocatalyst; and (b) an electron donor comprising an unsaturated nitrogen containing compound having the structural formula:

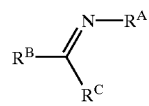

wherein $R^A$ is o-methoxyphenyl or o-methylphenyl;

$R^B$ is methyl, o-methoxyphenyl or o-methylphenyl; and $R^C$ are independently hydrogen or methyl, with the proviso that either $R^A$ or $R^B$, but not both, is o-methoxyphenyl.

25. The catalyst system of claim 24 wherein $R^A$ is o-methoxyphenyl, $R^B$ is o-methylphenyl, and $R^C$ is hydrogen.

26. The catalyst system of claim 24 wherein $R^A$ is o-methylphenyl, $R^B$ is o-methoxyphenyl, and $R^C$ is hydrogen.

27. The catalyst system of claim 24 wherein $R^A$ is methyl, $R^B$ is o-methoxyphenyl, and $R^C$ is methyl.

* * * * *

UNITED STATES PATENT AND TRADEMARK OFFICE
CERTIFICATE OF CORRECTION

PATENT NO. : 6,436,864 B1
DATED : August 20, 2002
INVENTOR(S) : Christopher D. Tagge and Robert B. Wilson Jr.

It is certified that error appears in the above-identified patent and that said Letters Patent is hereby corrected as shown below:

<u>Title page,</u>
Item [75], please add the name -- Robert B. Wilson Jr., Palo Alto, CA (US) --.

Signed and Sealed this

Fourth Day of February, 2003

JAMES E. ROGAN
*Director of the United States Patent and Trademark Office*